United States Patent
Bevan et al.

(10) Patent No.: US 8,370,090 B2
(45) Date of Patent: *Feb. 5, 2013

(54) RF FINGERPRINTING FOR LOCATION ESTIMATION

(75) Inventors: David Damian Bevan, Bishops Storford (GB); Ilya Averin, Nizhny Novgorod (RU); Denis Lysyakov, Nizhny Novgorod (RU)

(73) Assignee: Research In Motion Limited, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,884

(22) Filed: Mar. 21, 2012

(65) Prior Publication Data

US 2012/0178472 A1     Jul. 12, 2012

Related U.S. Application Data

(63) Continuation of application No. 12/479,970, filed on Jun. 8, 2009, now Pat. No. 8,170,815.

(51) Int. Cl.
*G01R 15/00* (2006.01)

(52) U.S. Cl. ............. 702/57; 702/62; 702/66; 702/71; 702/73; 455/456.1; 455/456.5; 455/402.2

(58) Field of Classification Search ............. 455/456.1, 455/456.2, 456.3, 456.5, 456.6, 404.2, 423; 702/57, 62, 65–66, 69–79, 94–95, 189–199

See application file for complete search history.

(56) References Cited

U.S. PATENT DOCUMENTS

| | | | | |
|---|---|---|---|---|
| 6,362,783 | B1 * | 3/2002 | Sugiura et al. | 342/457 |
| 6,570,394 | B1 * | 5/2003 | Williams | 324/620 |
| 6,944,465 | B2 * | 9/2005 | Spain et al. | 455/456.1 |
| 7,042,391 | B2 * | 5/2006 | Meunier et al. | 342/464 |
| 7,167,714 | B2 * | 1/2007 | Dressler et al. | 455/456.1 |
| 7,359,718 | B2 * | 4/2008 | Tao et al. | 455/456.5 |
| 7,383,051 | B2 * | 6/2008 | Spain et al. | 455/456.1 |
| 7,480,563 | B2 * | 1/2009 | Ichimura | 701/521 |
| 7,933,612 | B2 * | 4/2011 | Counts et al. | 455/457 |
| 7,949,346 | B2 * | 5/2011 | Capuzzello et al. | 455/456.1 |
| 2005/0037776 | A1 * | 2/2005 | Perez-Breva et al. | 455/456.1 |
| 2006/0276203 | A1 * | 12/2006 | Sambin | 455/456.1 |
| 2007/0010257 | A1 * | 1/2007 | Capuzzello et al. | 455/456.1 |
| 2007/0010956 | A1 * | 1/2007 | Nerguizian et al. | 702/57 |
| 2007/0021126 | A1 * | 1/2007 | Nanda et al. | 455/456.1 |
| 2009/0143065 | A1 * | 6/2009 | Mattila | 455/423 |
| 2009/0286549 | A1 * | 11/2009 | Canon et al. | 455/456.1 |

* cited by examiner

Primary Examiner — Jinsong Hu
Assistant Examiner — Magdi Elhag

(57) ABSTRACT

The location of a terminal is estimated within an area of coverage of a wireless network comprising at least one fixed node by measuring a complex frequency response of a radio channel between the terminal and one of said fixed nodes and estimating the location of the terminal on the basis of at least a comparison between data representing a first metric of the measured complex frequency response and data representing a plurality of stored metrics, each of said plurality of stored metrics being related to one of a plurality of different locations within the network and each stored metric being of a complex frequency response measured between the said one of said fixed nodes and the location within the network to which the metric relates.

16 Claims, 8 Drawing Sheets

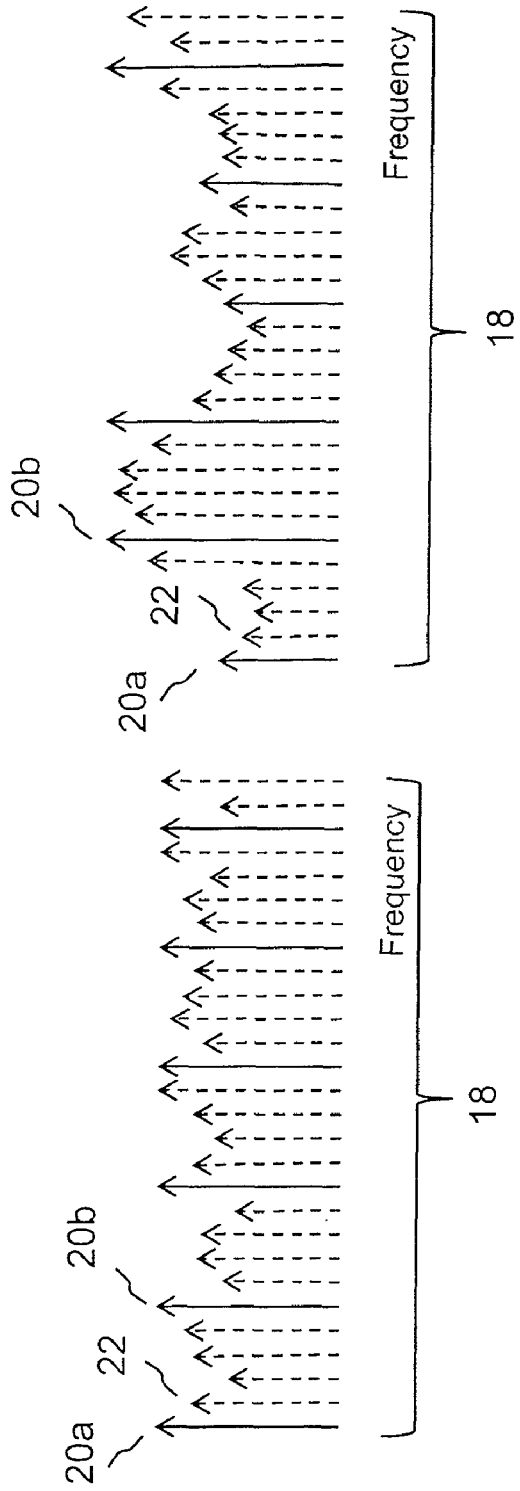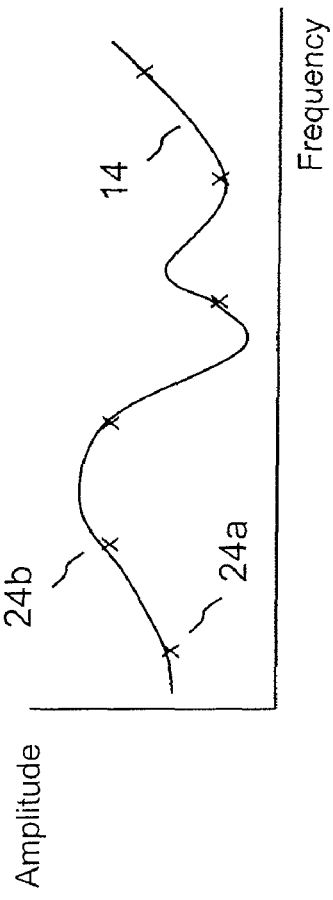
Figure 4b
Figure 4c
Figure 4a

RF FINGERPRINTING FOR LOCATION ESTIMATION

RELATED APPLICATION

This application is a continuation of U.S. patent application Ser. No. 12/479,970, filed Jun. 8, 2009, now U. S. Pat. No. 8,170,815.

FIELD OF THE INVENTION

The present invention relates generally to wireless networks, and more specifically to a method and apparatus for the estimation of the location of a terminal within the area of coverage of a wireless network.

BACKGROUND OF THE INVENTION

Data communications networks often include elements that are connected by a wireless link. Typically, a number of static or fixed wireless nodes such as access points may be deployed within a local zone to which mobile devices may form wireless connections, the connections typically conforming to an industry standard such as an IEEE 802.11 standard, for example IEEE 802.11a. Preferably the wireless access points are arranged in such a way as to give useful coverage in the zone or area of coverage concerned and are connected to a data network by wired or wireless links.

There are many applications in which it is necessary to know the location of a mobile terminal, and various systems have been proposed and implemented for location estimation of a terminal on the basis of measurements of radio frequency propagation. The known systems can be categorized according to whether or not they require a survey of the radio frequency environment to be carried out.

Systems for location estimation that do not require a survey include, for example, estimation of location by relative time of arrival of radio signals sent to or from fixed nodes in the network such as access points or base stations. The radio signals may be on the uplink or the downlink, that is to say the times of arrival may be measured at a terminal for signals sent from a plurality of fixed nodes, or at a plurality of fixed nodes for a signal sent from the terminal. Alternatively, it is known to estimate location based on the signal strength received at fixed nodes from a terminal or at the terminal from a plurality of fixed nodes. Such location systems based on time of arrival and/or received signal strength to or from a plurality of fixed nodes may be referred to as multilateration systems.

It is also known that location may be estimated based on measurements of angle of arrival of radio signals, which may be referred to as triangulation.

Location systems and methods that do not require a survey typically rely on assumptions about radio frequency propagation, for example that the radio channel follows a direct line of sight path, and that the signal is not attenuated by obstructions. While this may be a reasonable assumption in many environments, indoor environments such as a typical office or business premises may involve severe multi-path, obstructions, and non-line of sight propagation, so that the accuracy of such location systems may be severely degraded.

Although satellite navigation systems such as GPS may be employed for location purposes outdoors, such systems tend to be less effective indoors due to the difficulty in receiving signals transmitted from satellites.

To enable location estimation in environments with unpredictable radio propagation characteristics, typically indoors, it is known to implement a system based on measurements of the radio frequency environment in terms of the strength of signals received at a terminal from a plurality of access points. The location is estimated by comparison of the measured received signal strengths with a database of received signal strengths from the access points, previously surveyed at a number of different locations throughout the area of coverage of the network. The measurements of received signal strength represent a "fingerprint" of a location in the network, that is to say a characteristic measure of the radio frequency environment of the location. However, location estimation by this method may suffer from ambiguities, in that a similar fingerprint may occur at several locations. The accuracy of the system may also be limited.

It is an object of the present invention to provide a method and apparatus which addresses these disadvantages.

SUMMARY OF THE INVENTION

In accordance with a first aspect of the present invention, there is provided a method of estimation of a location of a terminal within an area of coverage of a wireless network comprising at least one fixed node, the method comprising:

measuring a complex frequency response of a radio channel between the terminal and one of said fixed nodes; and estimating the location of the terminal on the basis of at least a comparison between data representing a first metric of the measured complex frequency response and data representing a plurality of stored metrics, each of said plurality of stored metrics being related to one of a plurality of different locations within the network and each stored metric being of a complex frequency response measured between the said one of said fixed nodes and the location within the network to which the metric relates.

An advantage of estimation of location on the basis of a complex frequency response is that, since a complex frequency response is a vector with multiple components, the measure contains more information than, for example, a simple measure of received power. Therefore, the measure is less likely to experience ambiguities, where the same values are experienced at different locations.

An advantage of estimation of location on the basis of a comparison between data representing a first metric data representing a plurality of stored metrics, each of said plurality of stored metrics being related to one of a plurality of different locations within the network is that the method is likely to be more accurate than methods that make assumptions regarding the nature of radio propagation. This is particularly important in radio environments exhibiting strong multipath or non-line-of-sight propagation, in which the assumptions would be likely to be inaccurate. The stored metrics may be determined by a prior survey, for example at points distributed throughout the area of coverage of the wireless network, that may be distributed in two or three dimensions.

Preferably, the first metric and the plurality of stored metrics are autocorrelation functions. The advantage of estimation of location on the basis of an autocorrelation function of a complex frequency response is that such an autocorrelation is more slowly changing with location than would be the complex frequency response itself. It is thus a robust measure, that is tolerant of errors in the locations used to generate stored metrics, and of minor changes in the radio propagation environment. Furthermore, the robustness and relatively slow-changing nature is well suited to the process of matching a measured value to a stored value, without the need for an unduly small spacing between the location of stored metrics.

Conveniently, the first metric and the plurality of stored metrics are frequency coherence functions. The frequency coherence function also exhibits a slowly-changing dependence on location and robustness.

Advantageously, the first metric and the plurality of stored metrics are normalised frequency coherence functions. An advantage of normalising the frequency coherence function is that the metric is made independent of received power, and thus independent of the power of the transmitter, or unknown or uncalibrated gains of antennas etc. This is beneficial in improving the robustness of the metric to variations in equipment output power, so that, for example, a terminal need not be set to the same output power as the equipment used to generate the stored metrics.

Preferably, the measurement of the complex frequency response of the radio channel between the terminal and said one of said fixed nodes is performed on the basis of a signal transmitted from a selected one of the terminal and to the said one of the said fixed nodes, the signal being received by the other of the terminal and the said one of the said fixed nodes. The measurement may thus be performed on the signal received by propagating either from the terminal to a fixed node, or in the opposite direction. Due to the propagation in a radio channel being generally reciprocal, the same complex channel response will be found irrespective of which direction the propagation takes place, providing that the carrier frequency is the same.

Advantageously the signal comprises an Orthogonal Frequency Division Multiplex symbol. Wireless systems that use Orthogonal Frequency Division Multiplex modulation are particularly suited for use in generating a complex channel response and a frequency coherence function, since received signals are converted to the frequency domain in any case in a standard OFDM receiver, and since the generation of a complex channel response is also inherent in the standard reception process, using standard pilot tones in the OFDM signal format.

Conveniently, a measure of the difference between the first metric and each of the stored metrics is evaluated and the position of the terminal is estimated on the basis of the location related to the stored metric for which the evaluated measure of the difference is a minimum. That is to say that the first metric is used as a fingerprint, that is matched to a number of stored fingerprints taken at different locations during a survey. The location with the fingerprint that has the closet match is taken as the most likely location.

Preferably, the fingerprint will comprise a set of metrics relating to the channel response between the terminal and two or more fixed nodes, and similarly the stored metrics will relate to channel responses to or from several fixed nodes. The match between the set of measured metrics and the set of stored metrics can then be done on the basis of a measure of difference, such as the mean square difference, between the measured set and the stored set. An advantage of using metrics relating to two or more fixed nodes is that location can be estimated with greater accuracy than would be the case if only a single metric were used.

In accordance with a second aspect of the present invention, there is provided a method of compiling survey data for use in the estimation of a location of a terminal within an area of coverage of a wireless network comprising at least one fixed node, the method comprising:

measuring a complex frequency response of a radio channel between a measurement node and one of said fixed nodes at a plurality of different locations within the network;

deriving data representing a metric of each measured complex frequency associate with each of the plurality of different locations; and storing the derived data for each of said plurality different locations together with an indication of the location within the network to which the metric relates.

In accordance with a third aspect of the present invention, there is provided a processor arranged to estimate a location of a terminal within an area of coverage of a wireless network comprising at least one fixed node, wherein the processor is arranged to receive a measurement of a complex frequency response of a radio channel between the terminal and one of said fixed nodes, and the processor is arranged to estimate the location of the terminal on the basis of at least a comparison between data representing a first metric of the measured complex frequency response and data representing a plurality of stored metrics, each of said plurality of stored metrics being related to one of a plurality of different locations within the network and each stored metric being of a complex frequency response measured between the said one of said fixed nodes and the location within the network to which the metric relates.

In accordance with a fourth aspect of the present invention, there is provided a computer readable medium encoded with computer executable instructions for causing a processor to estimate a location of a terminal within an area of coverage of a wireless network comprising at least one fixed node by receiving a measurement of a complex frequency response of a radio channel between the terminal and one of said fixed nodes, and estimating the location of the terminal on the basis of at least a comparison between data representing a first metric of the measured complex frequency response and data representing a plurality of stored metrics, each of said plurality of stored metrics being related to one of a plurality of different locations within the network and each stored metric being of a complex frequency response measured between the said one of said fixed nodes and the location within the network to which the metric relates.

Further features and advantages of the invention will be apparent form the following description of preferred embodiments of the invention, which are given by way of example only.

BRIEF DESCRIPTION OF THE DRAWINGS

FIG. 4a is a schematic diagram showing an OFDM symbol as transmitted;

FIG. 4b is a schematic diagram showing an OFDM symbol as received;

FIG. 4c is a schematic diagram showing the amplitude of a complex frequency response of a channel derived from the pilot tones of an OFDM symbol;

DETAILED DESCRIPTION OF THE INVENTION

In general, the present invention is directed to methods and apparatus for the estimation of the location of a terminal within an area of coverage of a wireless network.

By way of example an embodiment of the invention will now be described in the context of a WiFi network in a zone such as business premises, which is provided with a network of wireless access points, which may also be referred to as connection points or base stations, with which one or more user equipments can form wireless connections. The access points will typically include transceivers appropriate for a wireless connection and also a wired connection to a further portion of a data network, which may be a corporate network including a data centre in another location or it may include a connection to the internet. Various types of devices equipped with a wireless transceiver can be connected to the network via the connection points, such as personal computers (PCs) and mobile data units such as PDAs (personal digital assistant), which can be moved within the wireless coverage zone of an access point and also between access points within the business premises.

The present invention may be applied to data networks used to communicate any type of data including but not limited to digitally encoded voice signals, audio signals generally, images and video streams. The wireless signals may conform to industry standards such as IEEE 802.11 WiFi, but could also conform to cellular radio standards such as LTE or WiMax, or to other industry standards such as ultra-wideband radio, or to a proprietary standard, or could conform to no particular accepted standard.

Figure 1:
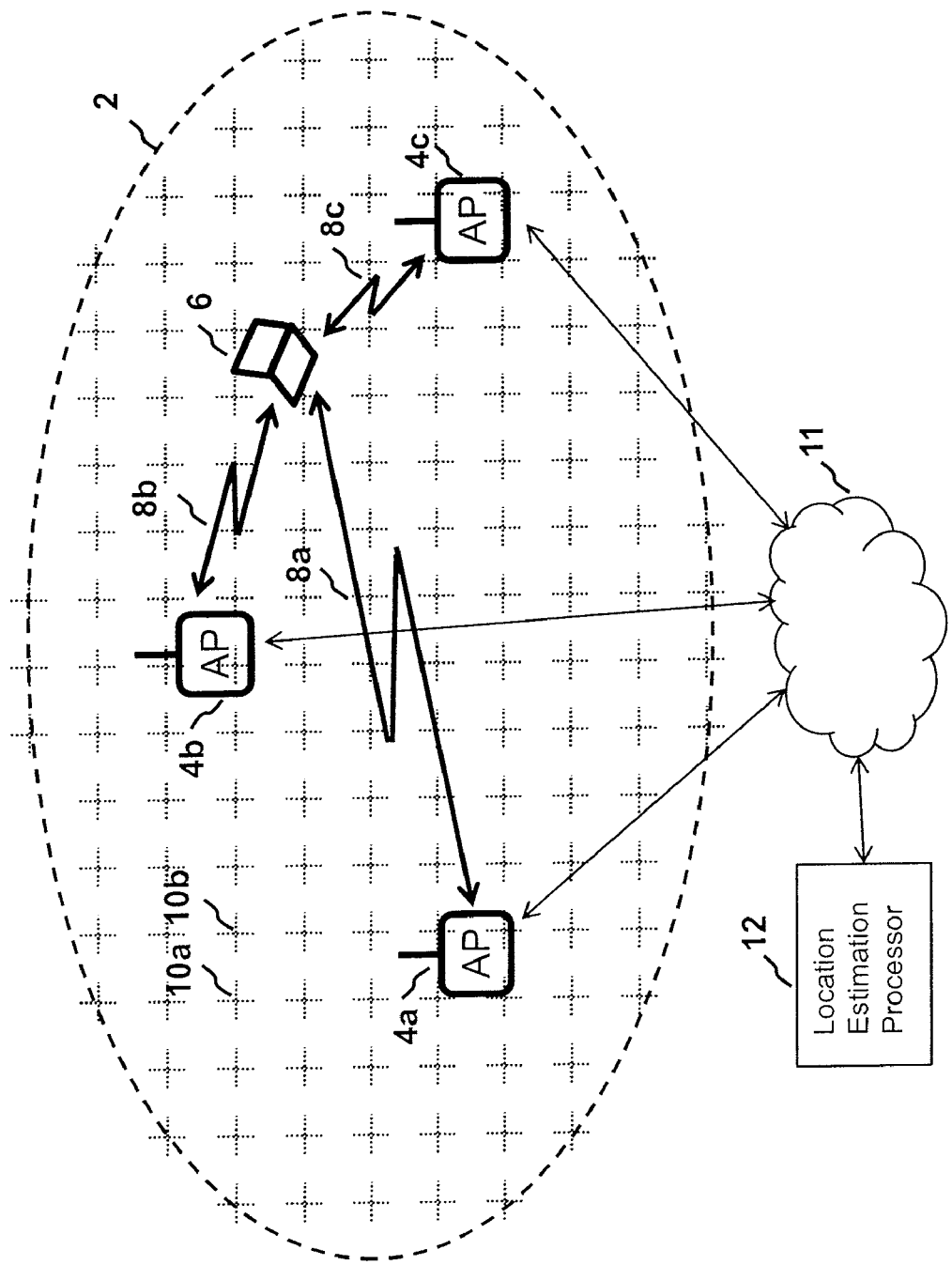
FIG. 1 is a schematic diagram showing a wireless network according to an embodiment of the invention.

FIG. 1 shows an embodiment of the invention. Three fixed nodes, that may be access points, 4a, 4b and 4c are shown within the area of coverage 2 of a wireless network. Each access point is connected, typically by a wired link, to a network 11, that may be a private data network or may be the public internet. A location estimation processor 12 is also connected to the network 11.

A terminal, 6, is located within the area of coverage 2 of the wireless network, and is in communication with access points 4a, 4b and 4c.

The embodiment of the invention relates to a method of estimating the location of the terminal 6 within the wireless network by the use of a radio frequency (RF) fingerprinting technique. An RF fingerprint is a characteristic measure of the radio environment. In a preferred embodiment of the invention, the RF fingerprint is a frequency coherence function of the complex frequency response or responses of the radio channel between the terminal and one or more access points. The location of a terminal is estimated by measuring an RF fingerprint, and by comparing the measured fingerprint with a stored set of fingerprints relating to known locations.

Typically, the stored set of fingerprints has been taken previously during a survey, at locations distributed throughout the area of coverage. In FIG. 1, the area of coverage 2 has been previously surveyed, by measuring an RF fingerprint at each point on a grid marked as crosses 10a, 10b and so on. Typically, grid points may be spaced by approximately 2 m for a system operating at 2.4 GHz or 5 GHz. This figure is merely an example; greater or lesser values of grid spacing may also be employed. It is not necessary to cover the entire area of coverage in a survey, simply areas of interest, nor is it necessary to follow a regular grid pattern.

The double ended arrows 8a, 8b, and 8c represent the radio channels between the terminal and the access points. Generally speaking, wireless links are reciprocal, so the complex frequency response of the radio channels represented by 8a, 8b and 8c could be measured by signals propagating in either direction. However, in practice there is typically an advantage in using the terminal as a transmitter and the access points as receivers, since in this case, as will become apparent, the terminal may be used in unmodified form, and the access points may be modified to generate the metrics or sets of metrics (i.e. fingerprints) used for location estimation. Generally the terminals may be selected from a variety of legacy items and it is advantageous that their position may be found without the need for modification. While the invention will be described mainly with reference to embodiments in which the terminal is a transmitter and the fixed node or nodes are used as receivers for the purposes of location estimation, it is quite feasible to perform location estimates with the signal flow in the opposite direction.

Figure 3:
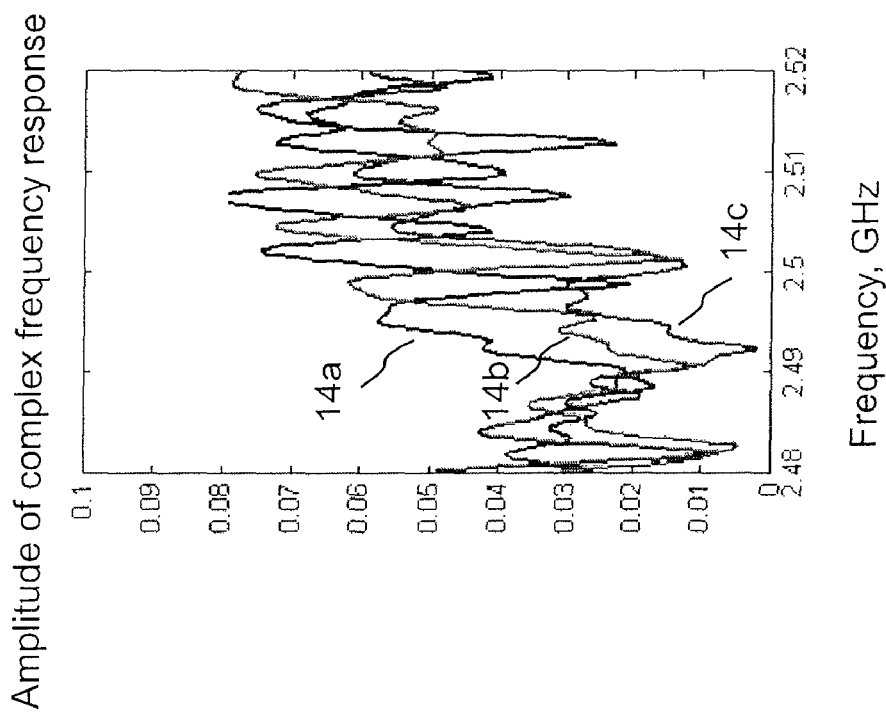
FIG. 3 shows the amplitudes of three exemplary frequency coherence functions according to an aspect of the invention.
Figure 2:
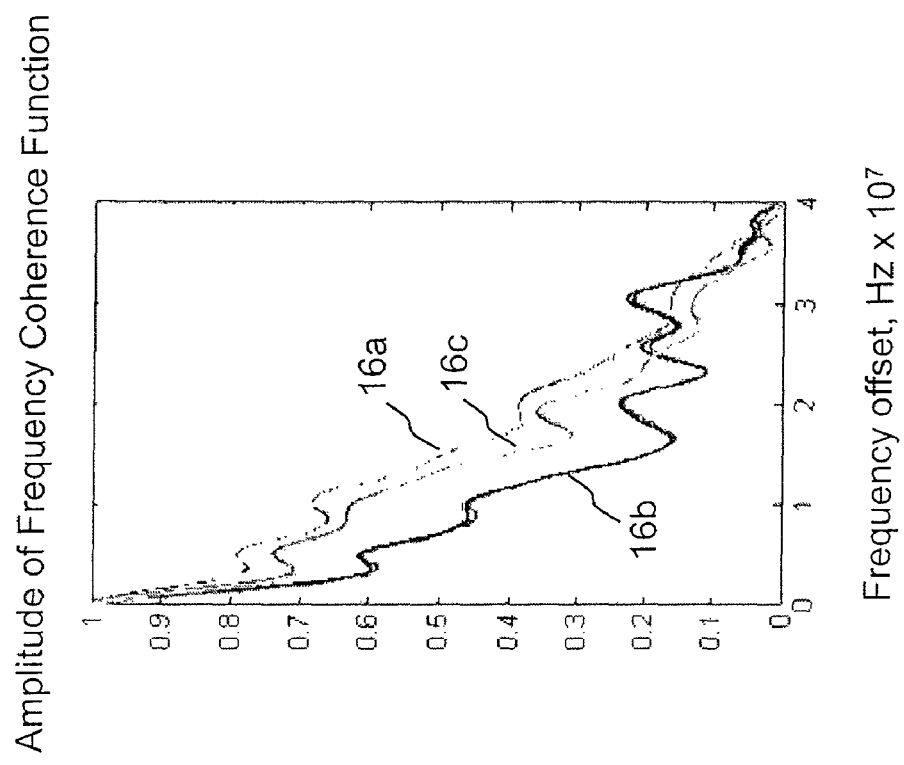
FIG. 2 shows the amplitudes of three exemplary complex channel responses.

As has been mentioned, a frequency coherence function, derived from the complex channel response, is used as a characteristic measure of the radio environment in an embodiment of the invention. FIG. 2 shows three complex frequency responses (the amplitude only is shown for clarity) 14a, 14b, 14c relating to three closely spaced locations (about 10 cm apart). FIG. 3 shows the equivalent frequency coherence functions (again, only the amplitude is shown for clarity) 16a, 16b, 16c relating to the same three locations. It can be seen from a comparison of the curves that the complex frequency response varies greatly (at a given frequency) as a result of a small movement, whereas the frequency coherence function varies less as a result of the small movement. In general, it has been found that the frequency coherence function is a better measure to use as a characteristic measure of an RF environment than a complex frequency response, because it is more robust in that it requires little or no averaging to produce repeatable results.

The frequency coherence function (FCF) can be expressed as follows:

$$\hat{R}_m = \sum_{k=0}^{N-m-1} \hat{H}_{k+m} \hat{H}_k^* \quad (1)$$

Where N is the number of channel response sample points, m is the frequency offset in terms of sample positions, k is the frequency in terms of sample positions, H is the complex channel response, and H "star" is the complex conjugate of the estimated complex channel response. The FCF is thus a complex vector of m terms. It can be seen that the FCF is a form of autocorrelation of the estimated complex channel response. In practice, the true complex channel response H is not known, simply the estimated complex channel response. It is common practice to refer to an estimated channel response as simply a "channel response", since it is understood that something that is measured is necessarily an estimate. Similarly, the true frequency coherence function R is strictly speaking not known, rather the estimated frequency coherence function. The "hat" symbol shown above R and H denotes an estimate.

FIGS. 4a, 4b, and 4c illustrate the use of pilot tones in an Orthogonal Frequency Division Multiplex system to derive the complex frequency response of a channel.

OFDM is the basis of an increasing number of modern wireless standards, amongst them 802.11a, 802.11g, WiMax and LTE. Systems using OFDM are particularly suited for use in embodiments of the present invention, since they form complex channel response estimate as an inherent part of the demodulation process; this could potentially be used to form an FCF with a relatively minor modification.

FIGS. 4a, 4b, and 4c illustrate the use of pilot tones in an Orthogonal Frequency Division Multiplex system to derive the complex frequency response of a channel. FIG. 4a shows an OFDM symbol 18 as transmitted, shown in the frequency domain. It can be seen there are a number of subcarriers, comprising pilot tones 20a, 20b transmitted at a pre-determined amplitude and phase and data tones 22 which are modulated to carry data.

FIG. 4b shows the OFDM symbol 18 as received, after transmission through a channel. It can be seen that the amplitude profile has been changed by the channel response (the phase, not shown, will also be affected).

FIG. 4c shows the amplitude of a complex channel response 14 derived from the pilot tone values 24a, 24b.

Some transmission formats may contain OFDM symbols in which all of the subcarriers are transmitted at a known amplitude and phase state, so that the channel response can be estimated from a received symbol. Such known symbols typically occur in a preamble. Other symbols, in particular symbols carrying payload data, typically have a subset of the subcarriers reserved as pilot tones (as shown schematically in FIG. 4a, not representative of actual numbers of pilot tones), and the majority of the subcarriers used to carry data. These pilot tones are typically used to build up a channel estimate over time. An autocorrelation of the channel estimate, that is to say an autocorrelation of an estimate of the complex channel response, can be used as the basis of the FCF. It can thus be understood that not every subcarrier position, or point in the channel estimate, need be derived directly from a pilot symbol, but may instead be derived by interpolation between pilot symbols.

The following derivation is based on a case in which every subcarrier is a pilot tone of known transmitted state, but from the fore-going it will be apparent that, although this is a useful example, this need not be the case.

If $S_k$ is the complex amplitude of the signal received at the k-th frequency at the point (x,y), $D_k$ is the known pilot symbol at the k-th frequency, and $Z_R$ is the noise term at the k-th frequency, then:

$$S_k(x,y) = H_k(x,y)D_k + Z_k(x,y) \quad (2)$$

And we can estimate the channel as:

$$\hat{H}_k(x, y) = \frac{S_k(x, y)}{D_k} \quad (3)$$

It can be seen that the estimate of H may be used to derive the Frequency Coherence Function using equation (1).

It should also be noted that the frequency coherence function may be derived by a Fourier transform of the power delay profile of a received signal.

Figure 5:
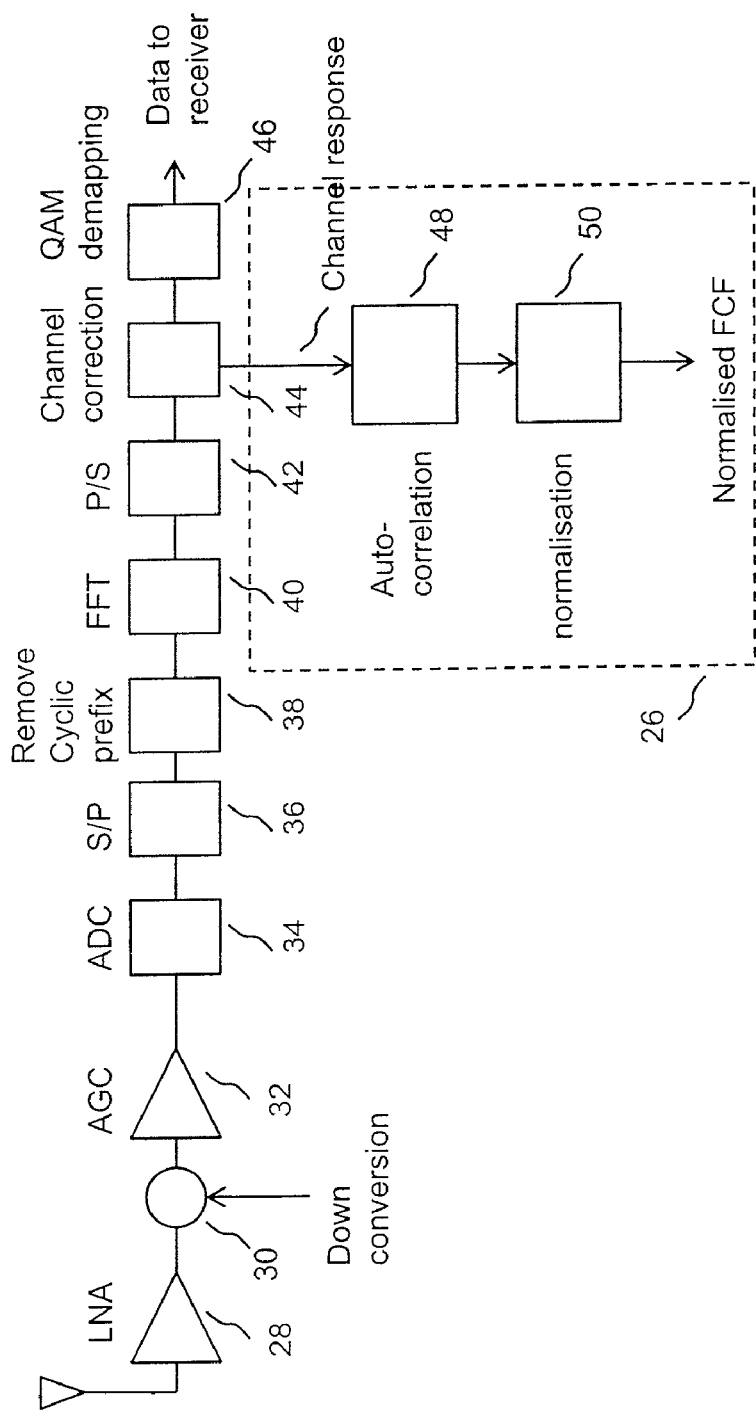
FIG. 5 is a schematic diagram showing a receive chain of an OFDM receiver adapted to derive a frequency coherence function in an embodiment of the invention.

FIG. 5 is a schematic diagram showing a receive chain of an OFDM receiver adapted to derive a frequency coherence function in an embodiment of the invention. It should be noted that the following parts form an entirely conventional OFDM receiver: the low noise amplifier 28, the downconversion 30, the automatic gain control 32, the analogue to digital converter 34, the serial to parallel conversion 36, the cyclic prefix removal 38, the Fast Fourier Transform 40, the parallel to serial conversion 42, the channel correction 44 and the QAM demapping 46.

The channel correction block 44 involves an estimation, that is to say measurement, of the complex channel response between the OFDM transmitter and receiver. The complex channel response is taken from the channel correction block 44 and passed, according to an embodiment of the invention, to an autocorrelation function 48 arranged to produce a frequency coherence function. This may then be power normalised by a power normalisation function 50, to produce a normalised frequency coherence function.

Figure 6:
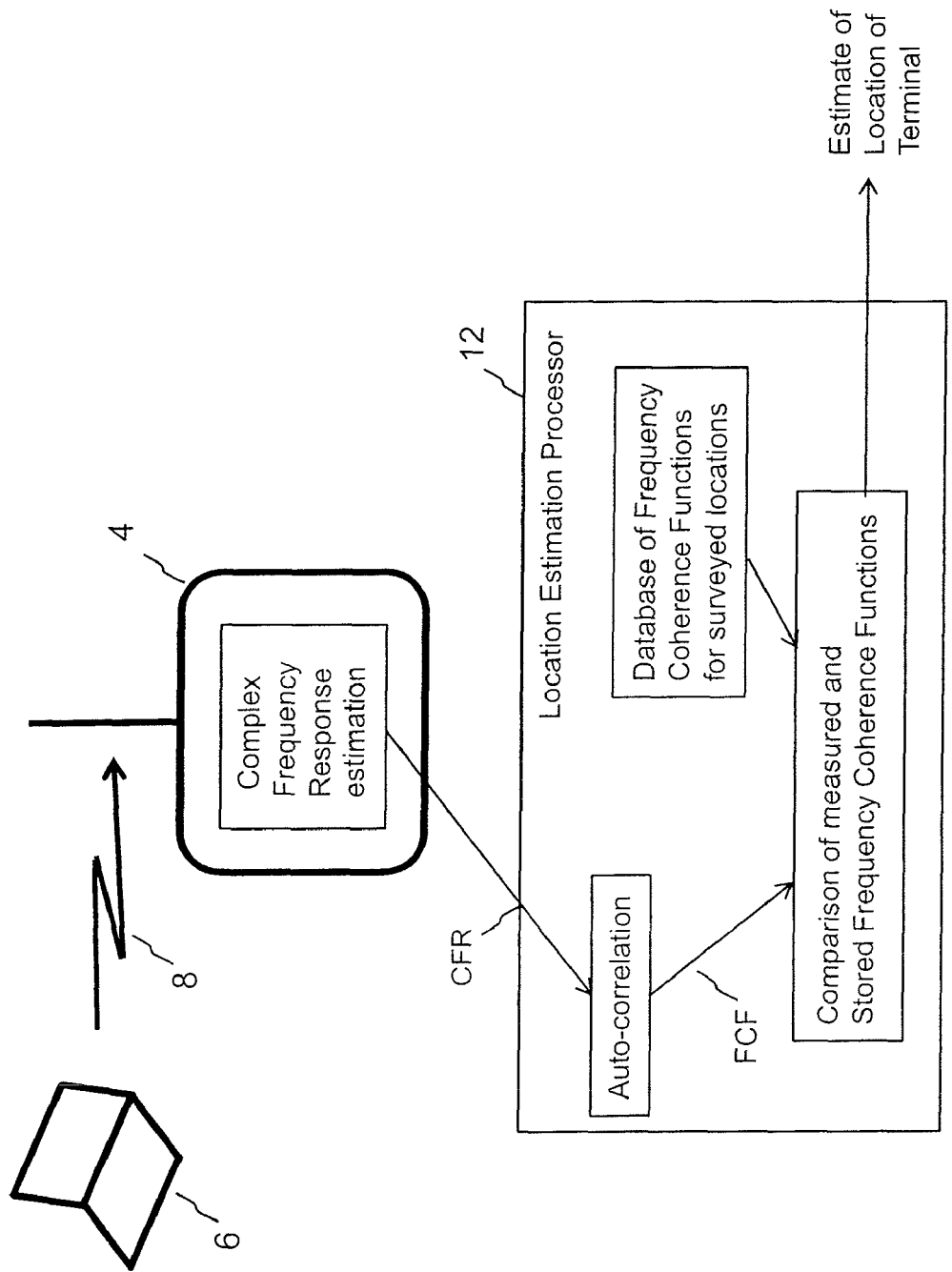
FIG. 6 is a schematic diagram illustrating a system for the estimation of the location of a terminal on the basis of signals received from the terminal at a fixed node as an embodiment of the invention.

FIG. 6 shows how a location estimation system may be implemented as an embodiment of the invention, in which a terminal 6 is used as transmitter and an access point is used as a receiver 4. The complex channel response of the radio channel 8 between the terminal 6 and the access point 4 is estimated, that is to say measured, in the complex frequency response estimation function within the access point 4.

The complex frequency response measurement is then sent via an appropriate link to the location estimation processor 12, which may be implemented, for example, on a personal computer or as part of a radio network controller.

On reception of the complex frequency response, the location estimation processor performs an autocorrelation function to produce a measured frequency coherence function. The measured frequency coherence function is then compared with the contents of a database of frequency coherence functions, which have typically been previously measured as part of a RF survey at a number of different locations within the area of coverage of the access point.

The comparison may be on the basis of, for example, the mean squared difference between corresponding frequency offset components of the frequency coherence functions. The stored frequency coherence function with the minimum mean squared difference is declared the closest match to the measured frequency coherence function, and the location at which it is measured is taken as the estimate of the location of the terminal.

It should be noted that the choice of the complex frequency response as the data to be sent to the location estimation processor was for illustration only; of course, the frequency coherence function could be calculated in the access point, and indeed the location estimation processor could be located at the access point.

Figure 7:
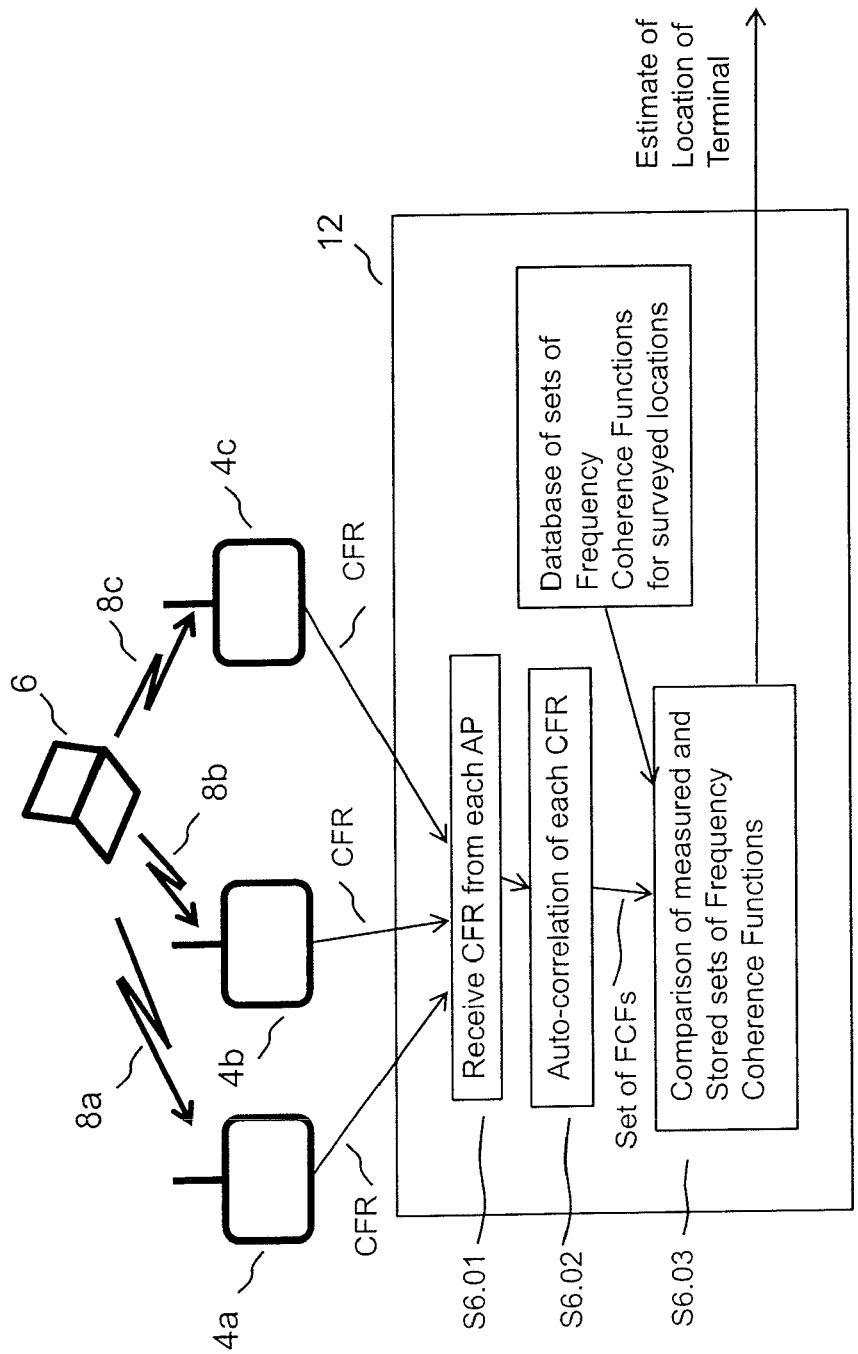
FIG. 7 is a schematic diagram illustrating a system for the estimation of the location of a terminal on the basis of signals received from the terminal at a plurality of fixed nodes as an embodiment of the invention.

FIG. 7 shows how a location estimation system may be implemented as an embodiment of the invention in which a terminal 6 is used as transmitter and three access points 4a, 4b and 4c are used as receivers. The complex channel responses of the radio channels 8a, 8b and 8c between the terminal 6 and the access points 4a, 4b and 4c are calculated within the access points 4a, 4b and 4c. The complex frequency response measurements are then sent via an appropriate link to the location estimation processor 12, which may be implemented, for example, on a personal computer or as part of a radio network controller. As previously commented upon, the split of functions between physical entities is simply for illustration, and in principle any of the functions following reception of the signal could be carried out in an access point, or the location estimation processor, or indeed at a different processor or node of the network.

On reception of the complex frequency responses (step S6.01), the location estimation processor performs an autocorrelation function on each complex frequency response (step S6.02) to produce a measured frequency coherence function for each, forming a set of frequency coherence functions, that is to say a set comprising a metrics of each channel frequency response. The set may be referred to as an RF fingerprint.

The RF fingerprint, i.e. the set of measured frequency coherence functions is then compared (step S6.03) with the contents of a database of RF fingerprints, which have typically been previously measured as part of a RF survey at a number of different locations within the area of coverage of the access point.

The comparison may be on the basis of, for example, the mean squared difference between corresponding frequency offset components of corresponding frequency coherence functions (i.e frequency coherence functions relating to measurements at the same access point). The stored frequency coherence function with the minimum mean squared difference is declared the closest match to the measured frequency coherence function, and the location at which it is measured is taken as the estimate of the location of the terminal. This may be referred to as a hard decision.

The location of a terminal may also be estimated by a so-called soft decision, in which the position estimate may take a value between the measurement points of the survey. In this case, two or more measurement locations are selected with the least difference, or least mean squared difference, from the measured fingerprint, and the location is estimated by interpolation between these points. The advantage over the soft decision may be an improvement in the accuracy of the location estimation.

Figure 8:
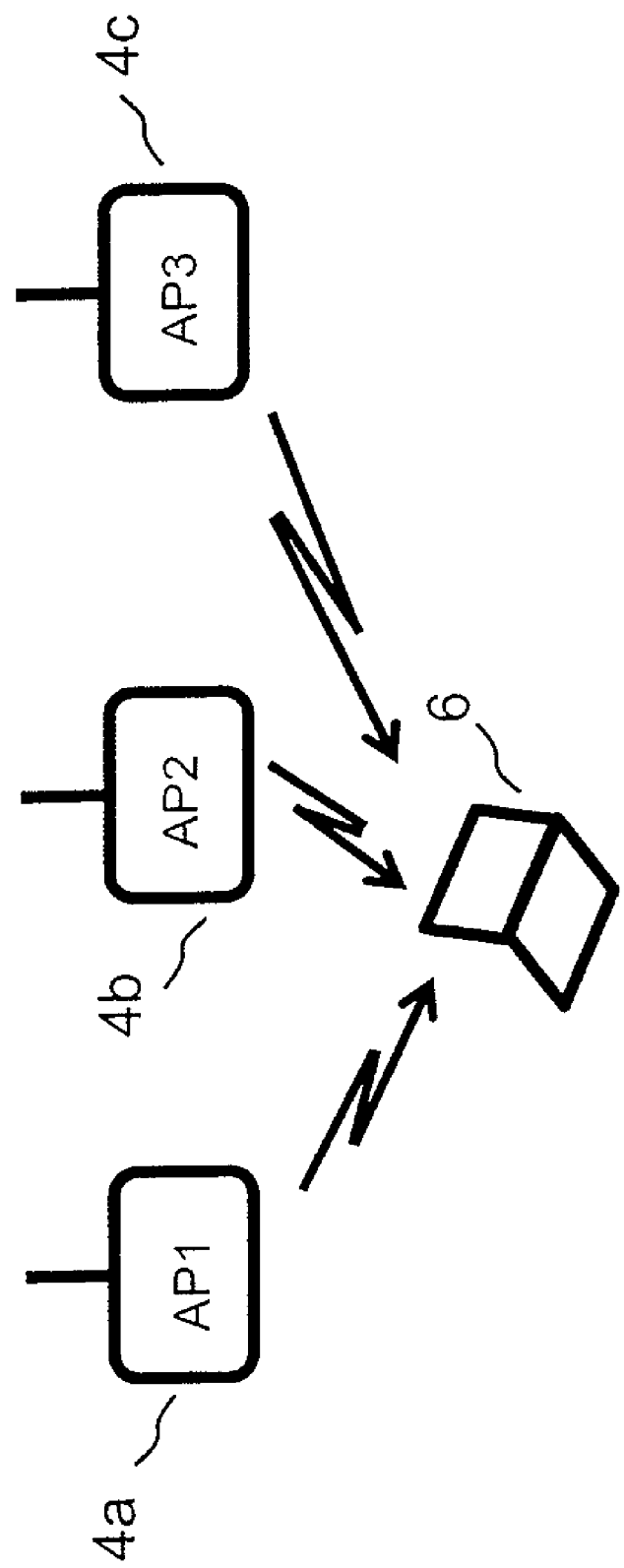
FIG. 8 is a schematic diagram illustrating a system for the estimation of the location of a terminal on the basis of signals received at a terminal from a plurality of fixed nodes as an embodiment of the invention.

FIG. 8 shows an embodiment, in which three access points 4a, 4b, 4c are used as a transmitters and a terminal 6 is used as a receiver. In this case, it may be convenient for the terminal to receive beacon signals or frames transmitted by the access points, and to use these as the basis of the calculation of the frequency coherence functions. However, it should be noted that other transmitted signals could also be used, such as conventional OFDM symbols similarly to the where the terminal is used as a transmitter. Beacon frames are just like any other frames, in as much as they consist of preambles and OFDM symbols. The only substantial difference is that they do not carry payload data, but rather they carry information about the access point, such as its identity and capabilities.

Figure 9:
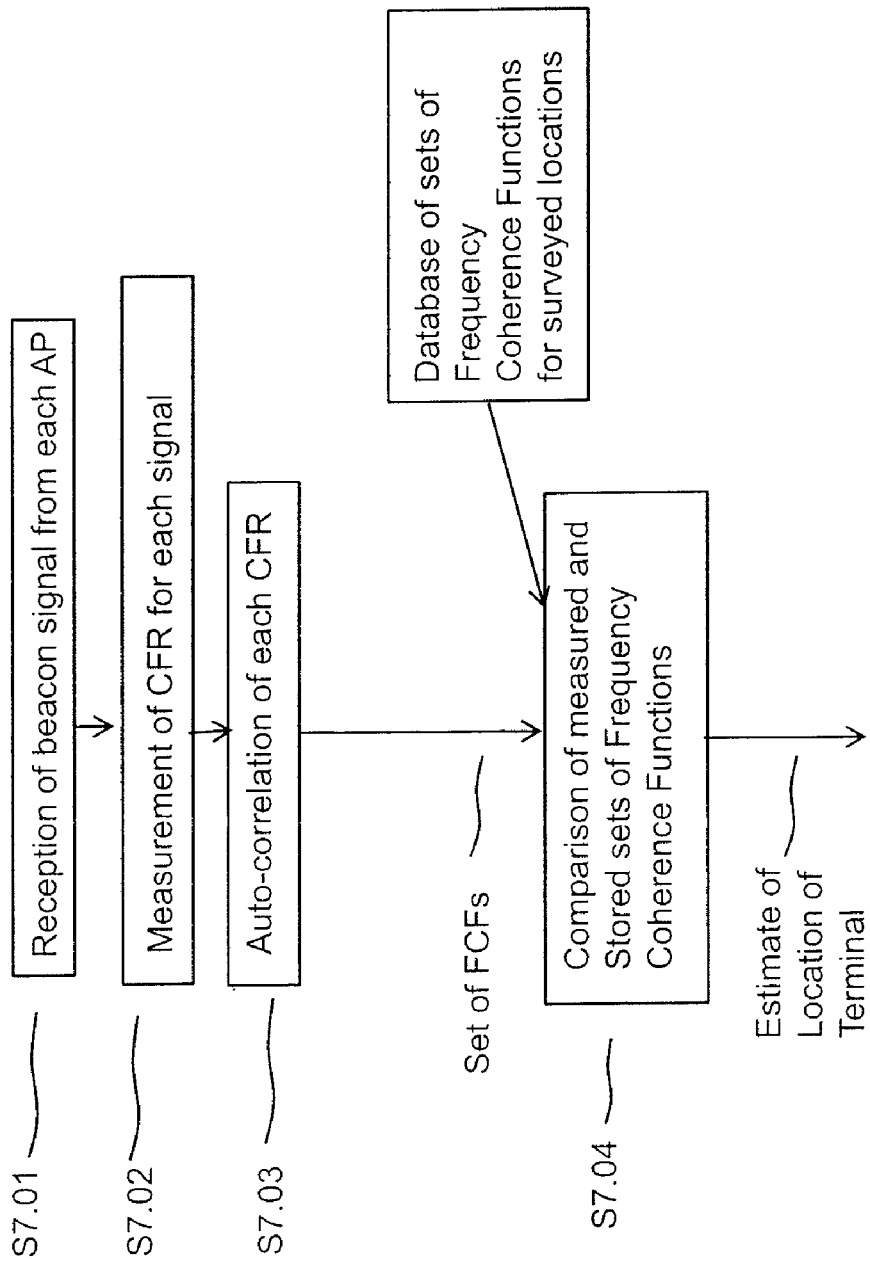
FIG. 9 shows the steps involved in the estimation of the location of a terminal on the basis of signals received at a terminal from a plurality of fixed nodes as an embodiment of the invention.

FIG. 9 illustrates the steps involved in location estimation using the embodiment of FIG. 7. At step S7.01, beacon signals are received from each of the access points 4a, 4b, 4c. At step S7.02, a complex frequency response is measured for each received beacon signal. At step S7.03, an autocorrelation is performed on each complex frequency response to produce a set of frequency coherence functions, that is to say RF fingerprints. The RF fingerprint is then compared with a stored set of RF fingerprints. As before, the RF fingerprint with the best match may be used to indicate the likely location of the terminal as a hard decision, or an interpolation between two or more best matches may be used to produce an interpolated location estimation as a soft decision.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Measurement apparatus for compiling survey data for use in the estimation of a location of a terminal within a coverage area of a wireless network, the wireless network comprising at least one fixed node, the measurement apparatus comprising:
   at least one processor; and
   at least one memory coupled to the processor, the at least one memory storing instructions executable by the at least one processor:
      to measure a complex frequency response of a radio channel between the apparatus and the at least one fixed node with the apparatus located at each of a plurality of different locations within the network;
      to derive data representing an autocorrelation function of each measured complex frequency response associated with each of the plurality of locations; and
      to store the derived data for each of the plurality of different locations in the at least one memory together with an indication of the location to which the autocorrelation function relates.

2. The measurement apparatus of claim 1, wherein the autocorrelation functions are frequency coherence functions.

3. The measurement apparatus of claim 2, wherein the frequency coherence functions are normalized frequency coherence functions.

4. The measurement apparatus of claim 1, wherein the instructions executable to measure a complex frequency response of a radio channel between a measurement node and a fixed node are instructions to measure the complex frequency response on the basis of a signal transmitted from a selected one of the measurement apparatus and the at least one fixed node, the signal being received by an other of the measurement apparatus and the at least one fixed node.

5. A non-transitory processor-readable medium encoded with processor-executable instructions for use by a measurement apparatus in compiling a survey data for use in the estimation of a location of a terminal within a coverage area of a wireless network, the wireless network comprising at least one fixed node, the instructions comprising instructions executable by a processor;
   to measure a complex frequency response of a radio channel between the measurement apparatus and the at least one fixed node with the measurement apparatus located at each of a plurality of different locations within the network;
   to derive data representing an autocorrelation function of each measured complex frequency response associated with each of the plurality of locations; and
   to store the derived data for each of the plurality of different locations in the at least one memory together with an indication of the location to which the autocorrelation function relates.

6. The processor-readable medium of claim 5, wherein the autocorrelation functions are frequency coherence functions.

7. The processor-readable medium of claim 6, wherein the frequency coherence functions are normalized frequency coherence functions.

8. The processor-readable medium of claim 5, wherein the instructions executable to measure a complex frequency response of a radio channel between a measurement node and a fixed node comprise instructions to measure the complex frequency response on the basis of a signal transmitted from a selected one of the measurement apparatus and the at least one fixed node, the signal being received by an other of the measurement apparatus and the at least one fixed node.

9. A method of operating a measurement apparatus to compile survey data for use in the estimation of a location of a terminal within a coverage area of a wireless network, the wireless network comprising at least one fixed node, the method comprising:

measuring a complex frequency response of a radio channel between the measurement apparatus and the at least one fixed node with the measurement apparatus located at each of a plurality of different locations within the network;

deriving data representing an autocorrelation function of each measured complex frequency response associated with each of the plurality of locations; and storing the derived data for each of the plurality of different locations in the at least one memory together with an indication of the location to which the autocorrelation function relates.

10. The method of claim 9, wherein the autocorrelation functions are frequency coherence functions.

11. The method of claim 10, wherein the frequency coherence functions are normalized frequency coherence functions.

12. The method of claim 9, wherein measuring the complex frequency response of a radio channel between a measurement node and a fixed node comprises measuring the complex frequency response on the basis of a signal transmitted from a selected one of the measurement apparatus and the at least one fixed node, the signal being received by an other of the measurement apparatus and the at least one fixed node.

13. A wireless network comprising:
at least one fixed node operable to communicate with at least one wireless terminal within a serving area of the fixed node; and
at least one location estimation processor operable:
to receive a measurement of a complex frequency response of a radio channel between a terminal and a selected fixed node of the at least one fixed node; and
to estimate the location of the terminal on the basis of at least a comparison between data representing an autocorrelation function of the measured complex frequency response and data representing a plurality of stored autocorrelation functions, each of the plurality of stored autocorrelation functions being related to one of a plurality of different locations within the network, and each stored autocorrelation function being an autocorrelation function of a complex frequency response measured between the selected fixed node and the location in the network to which the autocorrelation function relates.

14. The wireless network of claim 13, wherein each autocorrelation function is a frequency coherence function.

15. The wireless network of claim 14, wherein each frequency coherence function is a normalized frequency coherence function.

16. The wireless network of claim 13, wherein the at least one location estimation processor is operable to measure the complex frequency response based on a signal transmitted from a selected one of the terminal and the selected fixed node, the signal being received by the other of the terminal and the selected fixed node.

* * * * *